July 9, 1940.  A. L. ZENT  2,206,994
ELECTRICALLY HEATED IMPLEMENT
Filed Nov. 9, 1938
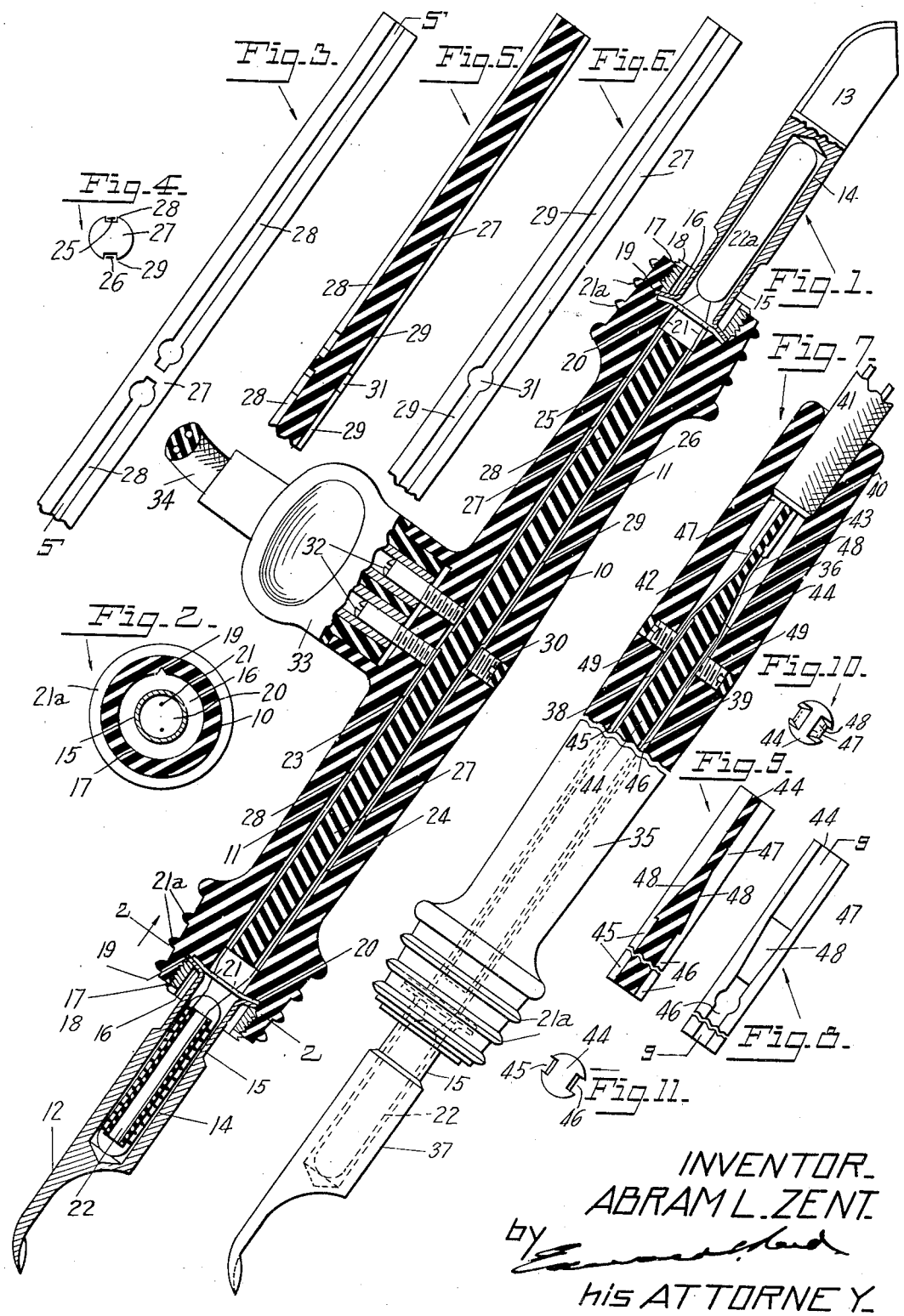
INVENTOR.
ABRAM L. ZENT.
by
his ATTORNEY Patented July 9, 1940

2,206,994

UNITED STATES PATENT OFFICE 2,206,994

ELECTRICALLY HEATED IMPLEMENT

Abram L. Zent, Dayton, Ohio, assignor to Joseph R. Schirmer, Kaylong, W. Va.

Application November 9, 1938, Serial No. 239,695

5 Claims. (Cl. 219—21)

This invention relates to an electrically heated implement and more particularly to a spatula for use by dentists in the preparation of wax forms preparatory to the casting of dental plates and the like.

Electrically heated implements as heretofore constructed, for the most part at least, have been of such a character and size that they were not adapted for dental work and dentists commonly use a spatula, the work element or tool of which must be periodically heated in a gas flame. This not only results in much lost time but the tool cools quickly and is not maintained at a uniform temperature while in use.

One object of the invention is to provide an electrically heated implement of small size and light weight which can be manipulated with the same ease and accuracy as the ordinary spatula and the tool of which may be maintained at a substantially constant temperature.

A further object of the invention is to provide such an implement in which the heating element and electrical connections will be of such a character and so arranged that they may be assembled on and in a slender light weight handle.

A further object of the invention is to provide an implement of such a character that the handle will receive but little heat from the heating element and tool and can be grasped by the operator at a point close to the tool.

A further object of the invention is to provide such an implement having improved means for assembling the conductors in a tubular handle of small diameter and for connecting said conductors with a source of electrical current.

Other objects of the invention may appear as the device is described in detail.

In the accompanying drawing Fig. 1 is a longitudinal sectional view taken centrally through an implement embodying the invention; Fig. 2 is a transverse sectional view taken on the line 2—2 of Fig. 1; Fig. 3 is a top plan view of a portion of the bar which guides and spaces the conductors; Fig. 4 is a transverse sectional view of that bar; Fig. 5 is a section taken on the line 5—5 of Fig. 2; Fig. 6 is a bottom plan view of a portion of the bar; Fig. 7 is an elevation, partly in section, of a slightly modified form of implement; Fig. 8 is a plan view, partly broken away, of the guide bar of Fig. 7; Fig. 9 is a longitudinal sectional view taken on the line 9—9 of Fig. 8; Fig. 10 is an elevation of the rear end of the bar of Fig. 7; and Fig. 11 is an elevattion of the front end of that bar.

In the drawing I have illustrated one embodiment of my invention, together with a minor modification thereof, and have shown the invention as applied to a dental spatula, but it will be understood that the invention may take various forms and may be provided with work elements or tools of various kinds.

In the embodiments here illustrated the implement comprises an elongate handle 10 having a longitudinal bore 11. This handle is preferably formed of insulating material of light weight and is of a relatively small diameter so as to provide a long slender handle which can be grasped by the fingers of the operator and easily manipulated. For the purpose of illustration the implement is shown in the drawing as of a size approximately twice the size in which it is made for dental purposes.

The implement may be provided with one or two tools and in that form shown in Fig. 1 of the drawing it is provided with a tool at each end thereof, the tool 12 being in the form of a spoon-shaped spatula and the tool 13 having a cutting edge. The tools may be of any suitable character and may be mounted on the handle in various ways, and usually the two tools will be identical in construction with the exception of the working portions thereof. The tool preferably has a hollow body portion to receive a heating element and, as shown at 14 in Fig. 1, this body portion is tubular in form and the elongate recess therein is open at its rear end. Preferably the rear end portion of the body 14 is of reduced diameter so as to provide the same with a relatively thin wall 15 which will have little heat conducting capacity. The body of the tool is provided at its rear end with a circumferential flange 16 which is seated in a recess or socket 17 in the end of the handle 10 and which, in the present instance, constitutes in effect an enlargement of the end of the bore 11. The tool may be retained in the socket in any suitable manner, as by an annular retaining member 18 mounted in the socket in spaced relation to the body of the tool and engaging the flange 16 to clamp the same in the recess. In the present instance this retaining member is screw threaded into the socket and the flange 16 is provided with a short sharp prong 19 which is forced into the wall of the socket by the action of the retaining member so as to hold the tool against rotation with relation to the handle, by the screw threaded retaining member or otherwise. Interposed between the flange 17 and the base of the socket is a disk 20 of heat insulating material to further reduce the transmission of heat from the tool to the handle. This preferably extends across the end of the bore 11 and is provided with openings 21 to receive the conductors for the heating element. Some heat may be transmitted from the tool to the handle and therefore I have provided the end portion of the handle adjacent to the tool with a series of external ribs 21a which will prevent the operator's fingers from coming into contact with the body of the handle should the latter be heated to an objectionable degree.

The outer portion of the recess 17 is slightly deeper than the inner portion thereof and the retaining member 18 engages the flange 16 near its periphery and bends the peripheral portion thereof into the deeper part of the recess, thus placing the flange under tension. Should the retaining member tend to loosen the flange, due to unequal expansion of the parts or otherwise, the resiliency of the flange will maintain the same in firm contact with the retaining member and the flange and tool will be held against movement.

The heating element 22 is of a well known type and is mounted in the tubular body portion of the tool. The heating element is provided with two conductors 23 and 24 which are preferably permanently connected therewith and are adapted to be inserted in the bore 11 of the handle when the tool is applied to the handle, these conductors extending through the openings 21 in the insulating disk 20. The tool 13 at the other end of the handle is provided with a heating element 22a having connected therewith conductors 25 and 26 which are inserted in the bore of the handle when the tool is applied to the latter. For the purpose of maintaining the conductors of each pair in properly spaced relation one to the other and for guiding the conductors of the two pairs into predetermined positions with relation one to the other, there is mounted in the bore 11 of the handle a bar 27 which preferably is of a length slightly less than the length of the bore and fits snugly within the same. This bar is provided in opposite sides thereof with longitudinal grooves 28 and 29 of a size adapted to receive the conductors which, in the present instance, are in the form of thin metal strips of narrow width. The conductors 24 and 26, in the groove 29, are of such length that when the respective tools are properly secured to the handle the inner end portions of the two conductors will overlap near the center of the handle. A set screw 30 threaded into the body of the handle engages one of the conductors and presses the two overlapping portions into firm electrical contact one with the other, the groove 29 being provided with an enlargement 31 to receive the end of the set screw. The conductors 23 and 25 in the grooves 28 have their inner ends spaced one from the other so that there will be no direct electrical connection between them and for this purpose the two grooves are separated one from the other, as shown in Fig. 3. Terminals 32 are screw threaded into the body of the handle to engage respectively the ends of the conductors 23 and 24 and these terminals project beyond the exterior surface of the handle and are adapted to be engaged by a connector 33, of an ordinary type, which is preferably carried by a flexible cord conductor 34 by means of which the circuit formed by the conductors 23, 24, 25 and 26 may be connected with a source of electric current, such as an ordinary utility outlet. The flexible cord permits of the free movement of the implement and the small light handle can be grasped by the operator in substantially the manner a pencil is grasped, and the tool manipulated with ease and accuracy.

In Fig. 7 the invention is shown as embodied in an implement comprising a handle 35 having a bore 36 and provided at one end only with a tool 37. The tool is similar to the tools above described and is connected with the handle in the same manner. The conductors 38 and 39 for the heating element of the tool extend into the bore 36 and to a point adjacent to or beyond the longitudinal center thereof. That end of the bore 36 opposite the tool 37 is shaped, as shown at 40, to receive the end of a flexible conductor cord 41 with which are connected two conductors 42 and 43 which enter the bore and are moved into overlapping relation respectively to the conductors 38 and 39. The conductors of each pair are maintained in spaced relation one to the other and the conductors of the two pairs are guided into their predetermined positions by a guide bar 44 having grooves 45 and 46 similar to the guide bar 27 with the exception that both grooves are continuous. The rear end of the bar 44 has the grooves increased in depth as shown at 47 to facilitate the insertion of the conductors 42 and 43 and to provide tapered recesses 48 to guide these conductors into overlapping relation to the conductors 38 and 39. Set screws 49 clamp the overlapping portions of the corresponding conductors in firm electrical contact one with the other.

While I have shown and described one embodiment of my invention, together with a minor modification thereof, I wish it to be understood that I do not desire to be limited to the details thereof as various modifications may occur to a person skilled in the art.

Having now fully described my invention, what I claim as new and desire to secure by Letters Patent, is:

1. In an electrically heated implement, a slender elongate handle having a small longitudinal bore, a bar arranged within said bore and having longitudinal guideways spaced one from the other, a tool mounted on one end of said handle, a heating element in said tool, conductors connected with said heating element for movement therewith and extending into the respective guideways of said bar, other conductors extending into said guideways at the other end of said bore, means carried by said handle and operable from the exterior thereof for connecting the adjacent ends of the conductors in at least one of said guideways one with the other, and for connecting all of said conductors in circuit with exterior conductors, said connecting means being normally held against movement to render said connections substantially permanent.

2. In an electrically heated implement, a slender elongate handle having a small longitudinal bore, a bar fitting snugly in said bore, extending for substantially the full length thereof and having longitudinal grooves spaced laterally one from the other to form guideways between said bar and the wall of said bore, a tool mounted on one end of said handle, a heating element mounted in said tool, conductors connected with said heating element for movement therewith and extending into the respective guideways, other conductors extending into said guideways from the other end of said bore, the conductors in one of said guideways being in overlapping relation and the conductors in the other of said guideways having their ends spaced one from the other, a set screw in said handle engaging the overlapping conductors to maintain them in contact, and terminals screw-threaded into said handle, engaging the respective spaced conductors and extending to the exterior of said handle.

3. In an electrically heated implement, a slender elongate handle having a small longitudinal bore, a bar fitting snugly in said bore, extending for substantially the full length thereof and having longitudinal grooves spaced laterally one from the other to form guideways between said bar and the wall of said bore, a tool mounted on one end of said handle, a heating element mounted in said tool, conductors connected with said heating element for movement therewith and extending into the respective guideways, other conductors extending into said guideways from the other end of said bore, overlapping the first mentioned conductors in the respective guideways and adapted to be connected with exterior conductors, and means mounted in said handle and operable from the exterior thereof for pressing the overlapping portions of said conductors into firm contact one with the other and for maintaining said contact throughout the operation of said implement.

4. In an electrically heated implement, a slender elongate handle having a longitudinal bore, a bar arranged in said bore and having longitudinal guideways extending for substantially the full length thereof, tools mounted on the respective ends of said handle, heating elements mounted in the respective tools, conductors connected with each heating element for movement therewith and extending into the respective guideways in said bar, the conductors in one of said guideways being in overlapping relation, the conductors in the other of said guideways being spaced one from the other, means mounted in said handle and operable from the exterior thereof for maintaining said overlapping conductors in substantially permanent contact one with the other, and terminals mounted in said handle, engaging the respective spaced conductors and extending to the exterior of said handle for connection with exterior conductors.

5. In an electrically heated tool, a slender elongate handle having a longitudinal bore which is enlarged at one end of said handle to form a socket, a tool comprising a tubular body having a thin inner end portion extending into said socket, spaced from the circumferential wall thereof and provided with an outwardly extending flange to engage the base of said socket, an annular retaining member mounted in said socket in spaced relation to said body and engaging said flange to clamp the latter against the base of said socket, a heating element in said hollow body, conductors connected with said heating element and extending into said bore, and means extending into the bore for connecting said conductors with a source of current.

ABRAM L. ZENT.